US008559886B2

(12) United States Patent
Zhao

(10) Patent No.: US 8,559,886 B2
(45) Date of Patent: Oct. 15, 2013

(54) DEVICE, METHOD AND SYSTEM FOR ALIGNING AN ANTENNA

(75) Inventor: Guixue Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 589 days.

(21) Appl. No.: 12/493,316

(22) Filed: Jun. 29, 2009

(65) Prior Publication Data

US 2010/0167675 A1 Jul. 1, 2010

(30) Foreign Application Priority Data

Dec. 30, 2008 (CN) .......................... 2008 1 0241994

(51) Int. Cl.
*H04B 17/00* (2006.01)

(52) U.S. Cl.
USPC .................. 455/67.15; 455/67.11; 455/67.14; 455/69; 455/70; 342/74; 342/75; 342/174; 343/760; 343/894

(58) Field of Classification Search
USPC ......... 455/67.11, 63.1, 70, 161.3, 266.1, 522; 342/357.11, 357.61, 375.75, 357.76
See application file for complete search history.

(56) References Cited

U.S. PATENT DOCUMENTS 4,696,053 A * 9/1987 Mastriani et al. .......... 455/67.16
4,797,677 A 1/1989 MacDoran et al.
5,313,215 A 5/1994 Walker et al.
6,278,405 B1 8/2001 Ha et al.
6,608,590 B1 * 8/2003 Naym et al. .................. 342/359
6,611,696 B2 * 8/2003 Chedester et al. ......... 455/562.1
6,661,373 B1 12/2003 Holliday
6,816,121 B1 11/2004 Cheing et al.
2004/0053634 A1 3/2004 Gainey et al.
2008/0088518 A1 * 4/2008 Charash et al. ............... 343/757
2008/0278387 A1 11/2008 Piole et al.
2011/0199274 A1 * 8/2011 Dalmazzo ..................... 343/760

FOREIGN PATENT DOCUMENTS

CN 1574459 2/2005
CN 101310453 11/2008
EP 0579407 A1 1/1994
WO 00/24083 A1 4/2000

OTHER PUBLICATIONS

Issue document for corresponding Chinese Patent Application No. CN101478336 (1 page).
Office Action, mailed Oct. 10, 2011, in corresponding Chinese Application No. 200810241994.0 (14 pp.).

* cited by examiner

*Primary Examiner* — Yuwen Pan
*Assistant Examiner* — Fatuma Sherif
(74) *Attorney, Agent, or Firm* — Staas & Halsey LLP

(57) ABSTRACT

The present invention relates to a communication transmission field, and particularly provides a device, a method, and a system for aligning an antenna. The method includes steps as follows. An input signal is received, and a receiver signal strength indication (RSSI) value is output according to a strength of the input signal. The RSSI value is received, and a practically received power value corresponding to the input signal is acquired by looking up a corresponding table between the RSSI and power. An antenna rotation signal and an alignment indication signal are output. The antenna is adjusted according to the antenna rotation signal so as to change a receiving angle of the antenna. Then, it is displayed that the antenna is aligned according to the alignment indication signal. In the present invention, the man-made operation errors are reduced, thus the network quality is effectively ensured.

7 Claims, 2 Drawing Sheets

DEVICE, METHOD AND SYSTEM FOR ALIGNING AN ANTENNA

CROSS-REFERENCE TO RELATED APPLICATIONS

This application claims priority to Chinese Patent Application No. 200810241994.0, filed on Dec. 30, 2008, which is incorporated herein by reference in its entirety.

FIELD OF THE INVENTION

The present invention relates to the communication transmission field, and more particularly to a device, a method, and a system for aligning an antenna.

BACKGROUND

In a microwave system, as shown in a schematic structural view of FIG. 1, a device for aligning an antenna in the prior art includes an indoor unit, an outdoor unit, and an antenna. The indoor unit and the outdoor unit are separately installed and connected through an intermediate frequency cable. If two microwave stations intend to normally communicate with each other, the antennas must be aligned so as to ensure that the microwave stations normally send/receive a signal. For a manner for aligning an antenna in the prior art, a received power electrical level indication interface is designed on the outdoor unit, and the interface outputs a voltage signal proportional to the received power. Referring to FIG. 1, the outdoor unit of the microwave system outputs a receiver signal strength indication (RSSI) signal. An operator preliminarily aligns the antenna according to latitude and longitude of the location of the antenna, and then tests the voltage signal RSSI output from a peer end outdoor unit by using an instrument. During the process of adjusting the antenna, one operator adjusts the antenna, and another operator tests the RSSI by using the instrument. Then, a threshold value of the system is calculated according to an RSSI table provided by the manufacturer of the microwave system, in consideration of the effect of the system path and the frequency. When the test voltage signal RSSI reaches the calculated threshold value after fine-adjusting the antenna, it is determined that the antenna is aligned.

The inventor(s) find in the researching process that the manner for adjusting the antenna in the prior art is relatively complicated, it is necessary to adjust the antenna while testing the voltage signal, and usually two persons are required to accomplish the process, one person monitors the instrument and checks the data, and the other person adjusts the antenna, thus forming a high manpower cost. If one person is required to accomplish the process, it is necessary to repeatedly test the data and adjust the antenna, so the adjusting efficiency is much lower, thus consuming relatively high manpower cost.

SUMMARY

Accordingly, embodiments of the present invention provide a device, a method and a system for aligning an antenna. Through the device, the method, and the system, man-made operation errors are reduced, thus effectively ensuring the network quality.

An embodiment of the present invention provides a device for aligning an antenna, which includes a receiving unit, a practically received power value acquiring unit, an alignment judging unit, an antenna adjusting unit, and an alignment indicating unit. The receiving unit is adapted to receive an input signal, and output an RSSI value according to a strength of the input signal. The practically received power value acquiring unit is adapted to receive the RSSI value, and acquire a practically received power value corresponding to the input signal by looking up a corresponding table between RSSI and power. The alignment judging unit is adapted to compare the practically received power value with a theoretically received power threshold value, output an antenna rotation signal to the antenna adjusting unit when the practically received power value is smaller than the theoretically received power threshold value, and output an alignment indication signal to the alignment indicating unit when the practically received power value is greater than or equal to the theoretically received power threshold value. The antenna adjusting unit is adapted to adjust the antenna according to the antenna rotation signal so as to change a receiving angle of the antenna. The alignment indicating unit is adapted to display that the antenna is aligned according to the alignment indication signal.

An embodiment of the present invention provides a method for aligning an antenna, which includes the steps as follows. An input signal is received, and an RSSI value is output according to a strength of the input signal. The RSSI value is received, and a practically received power value corresponding to the input signal is acquired by looking up a corresponding table between RSSI and power. The practically received power value is compared with a theoretically received power threshold value, an antenna rotation signal is output when the practically received power value is smaller than the theoretically received power threshold value, and an alignment indication signal is output when the practically received power value is greater than or equal to the theoretically received power threshold value. The antenna is adjusted according to the antenna rotation signal so as to change a receiving angle of the antenna. It is displayed that the antenna is aligned according to the alignment indication signal.

An embodiment of the present invention further provides an antenna alignment system, which includes a first alignment device, a second alignment device, a first antenna, and a second antenna. The first alignment device is adapted to send an alignment output signal to the second antenna through the first antenna according to an extreme value signal. The second antenna alignment device is adapted to receive the alignment output signal, and adjust and align the second antenna through an antenna adjusting unit in the second alignment device according to a strength of the alignment output signal.

It may be known that in the present invention, through the device and the method, the system calculates and outputs the alignment indication signal of the antenna, so that requirements of microwave antenna professional knowledge on operators are lowered, the man-made operation errors are reduced, the network quality is effectively ensured, and the manpower cost is lowered.

BRIEF DESCRIPTION OF THE DRAWINGS

The brief description of the drawings herein below are provided for the further understanding of the present invention, constitute a part of the present invention, and are not limitative of the present invention, and wherein.

DETAILED DESCRIPTION

The embodiments of the present invention are described below with the accompanying drawings, so as to facilitate those of ordinary skill in the art to understand and to implement the present invention there accordingly. Here, the schematic embodiments of the present invention and the descriptions thereof are adapted to explain the present invention without limiting the present invention.

Figure 1:
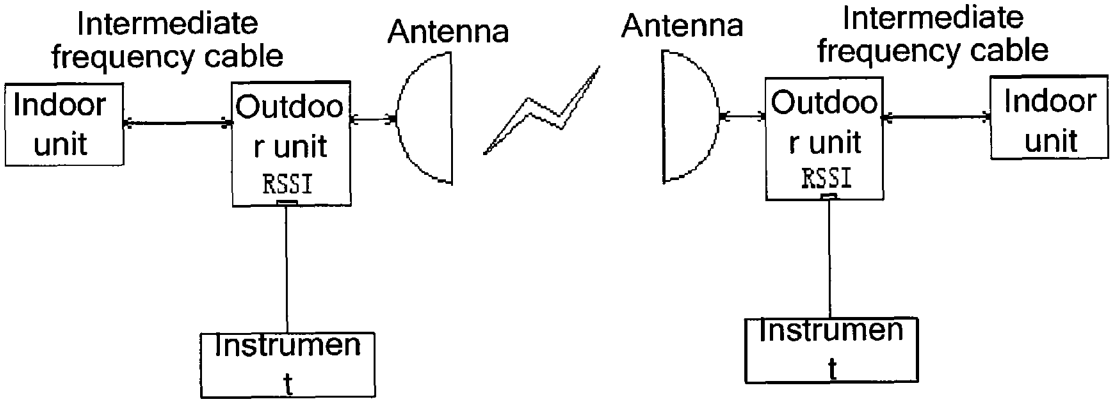
FIG. 1 is a schematic structural view of a device for aligning an antenna in the prior art.
Figure 2:
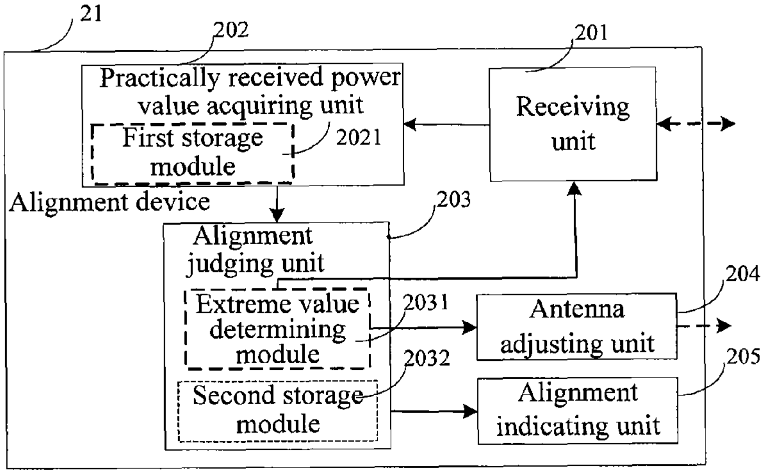
FIG. 2 is a schematic structural view of a device for aligning an antenna according to an embodiment of the present invention.

The structure of a device for aligning an antenna according to an embodiment of the present invention is shown in FIG. 2. An alignment device 21 includes a receiving unit 201, a practically received power value acquiring unit 202, an alignment judging unit 203, an antenna adjusting unit 204, and an alignment indicating unit 205.

The receiving unit 201 is adapted to receive an input signal, and output an RSSI value according to a strength of the input signal.

The practically received power value acquiring unit 202 is adapted to receive the RSSI value, and acquire a practically received power value corresponding to the input signal by looking up a corresponding table between RSSI and power.

The alignment judging unit 203 is adapted to compare the practically received power value with a theoretically received power threshold value, output an antenna rotation signal to the antenna adjusting unit 204 when the practically received power value is smaller than the theoretically received power threshold value, and output an alignment indication signal to the alignment indicating unit 205 when the practically received power value is greater than or equal to the theoretically received power threshold value.

The antenna adjusting unit 204 is adapted to adjust the antenna according to the antenna rotation signal so as to change a receiving angle of the antenna.

The alignment indicating unit 205 is adapted to display that the antenna is aligned according to the alignment indication signal. The alignment indicating unit may particularly be an interface adapted to provide an indication in high electrical level, low electrical level or square wave form, an indicator displayed interface, or a buzzer displayed interface.

In the embodiments of the present invention, the alignment judging unit 203 further includes an extreme value determining module 2031, which is adapted to output an extreme value signal to the receiving unit 201 when the practically received power value is greater than or equal to the theoretically received power threshold value. The receiving unit 201 is further adapted to send an alignment output signal for adjusting an alignment position of a peer end antenna to the antenna according to the extreme value signal.

The extreme value determining module 2031 is further adapted to use the practically received power value as an extreme value when the practically received power value is greater than or equal to the theoretically received power threshold value and output a first extreme value signal to the antenna adjusting unit. The antenna adjusting unit is further adapted to fix a position of the antenna according to the first extreme value signal. The receiving angle of the antenna changes within the range between −90 degree and +90 degree with an antenna stand as a rotation axis.

The extreme value determining module 2031 is further adapted to use a maximum value of the practically received power during an adjustment process as the extreme value, and output a second extreme value signal to the antenna adjusting unit. The antenna adjusting unit is further adapted to fix the position of the antenna according to the second extreme value signal.

In the embodiment of the present invention, the practically received power value acquiring unit 202 further includes a first storage module 2021 adapted to save the corresponding table between RSSI and power. The alignment judging unit 203 further includes a second storage module 2032 adapted to save the theoretically received power threshold value. The theoretically received power threshold value may be automatically calculated and acquired by the alignment device. Main input reference values include a peer end emitting power, a link attenuation and a link gain between two stations, and a practical reference value, that is, a modified value, required by subscribers when the device practically works. The link attenuation is relevant to a space distance, frequency, and other elements, and the link gain mainly refers to a transceiving antenna gain. The modified value may be manually configured through an operation and maintenance platform, and usually may be 1-5 dB. The theoretically received power threshold value may be represented in the form of a formula: theoretically received power threshold value=peer end emitting power−link attenuation+link gain+modified value.

Figure 3:
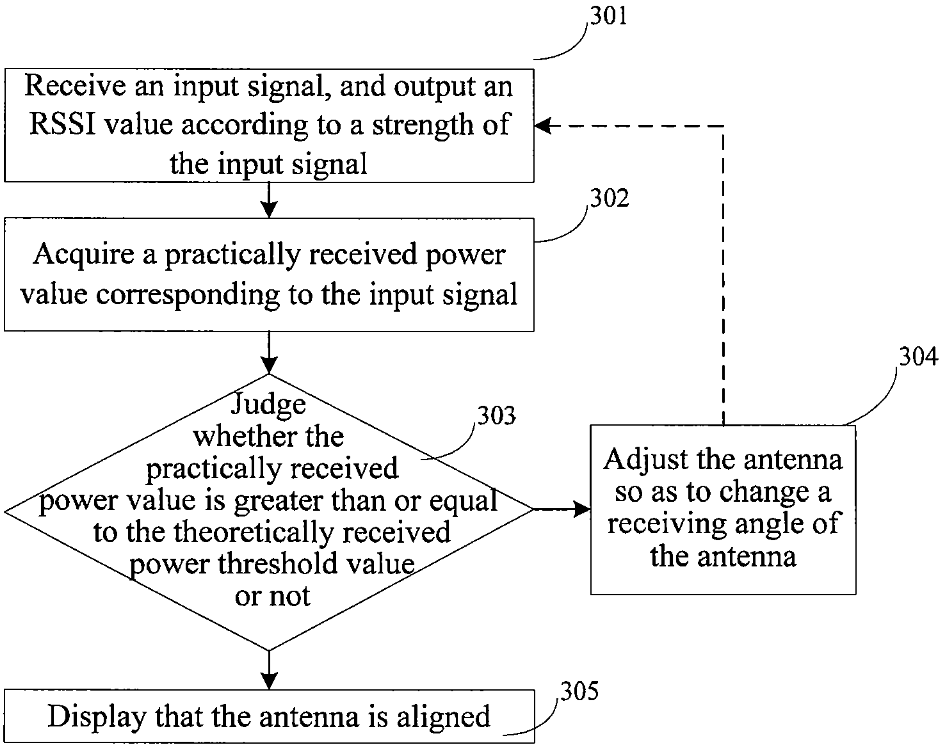
FIG. 3 is a flow chart of a method for aligning an antenna according to an embodiment of the present invention.

Referring to FIG. 3, a flow chart of a method for aligning an antenna according to an embodiment of the present invention is shown.

In Step 301, an input signal is received, and an RSSI value is output according to a strength of the input signal. In the embodiments of the present invention, a device for aligning an antenna detects an input signal average power envelope according to the strength of the input signal, and converts the input signal average power envelope to a numerical value, that is, the RSSI value.

In Step 302, the RSSI value is received, and a practically received power value corresponding to the input signal is acquired by looking up a corresponding table between RSSI and power. The corresponding table between RSSI and power is stored in the device for aligning antenna in advance.

In Step 303, the practically received power value is compared with a theoretically received power threshold value, an antenna rotation signal is output to an antenna adjusting unit when the practically received power value is smaller than the theoretically received power threshold value, and then Step 304 is executed. An alignment indication signal is output to an alignment indicating unit when the practically received power value is greater than or equal to the theoretically received power threshold value, and then Step 305 is executed.

The theoretically received power threshold value may be automatically calculated and acquired by the alignment device. Main input reference values include a peer end emitting power, a link attenuation and a link gain between two stations, and a practical reference value, that is, a modified value, required by subscribers when the device practically works. The link attenuation is relevant to a space distance, frequency, and other elements, and the link gain mainly refers to a transceiving antenna gain. The modified value may be manually configured through an operation and maintenance platform, and usually may be 1-5 dB. The theoretically received power threshold value may be represented in the form of a formula: theoretically received power threshold value=peer end emitting power−link attenuation+link gain+modified value.

In Step 304, the antenna is adjusted according to the antenna rotation signal so as to change a receiving angle of the antenna. When the receiving angle of the antenna is changed, correspondingly, the strength of input signal received in Step 301 may also be changed. When the strength of the input signal is changed, in the method according to the embodiment of the present invention, steps 301, 302, 303, and 304 are automatically and repeatedly executed, until the practically received power value is greater than or equal to the theoretically received power threshold value. In FIG. 3, the changing relationship is represented by a dashed line. The antenna adjusting unit may be a controllable electrical machine. Definitely, in the present invention, the rotation antenna is manually controlled without the controllable electrical machine.

In Step 305, it is displayed that the antenna is aligned according to the alignment indication signal. For example, the operator is indicated by using an indicator or a buzzer etc. In the embodiments of the present invention, the alignment indication signal interface is provided for the outside, and the alignment indication signal interface includes, but not limited to, an interface adapted to provide an indication in high level, low electrical level or square wave form, an indicator displayed interface, or a buzzer displayed interface etc. The operator accomplishes the process for adjusting the antenna with the guidance of the alignment indication signal.

Further, when the practically received power value is greater than or equal to the theoretically received power threshold value, the practically received power value is used as an extreme value, and a first extreme value signal is output. A position of the antenna is fixed according to the first extreme value signal.

Further, a maximum value of the practically received power during the adjustment process is used as the extreme value, and a second extreme value signal is output to the antenna adjusting unit. The position of the antenna is fixed according to the second extreme value signal. In the embodiment of the present invention, an alignment output signal for adjusting an alignment position of a peer end antenna is sent to the antenna according to the second extreme value signal.

In the steps of the method, the detailed signal processing and executing processes and other content are based on the same concept as that of the embodiment of the device according to the present invention. Reference can be made to description in the embodiment of the device according to the present invention, and the description is omitted here.

Figure 4:
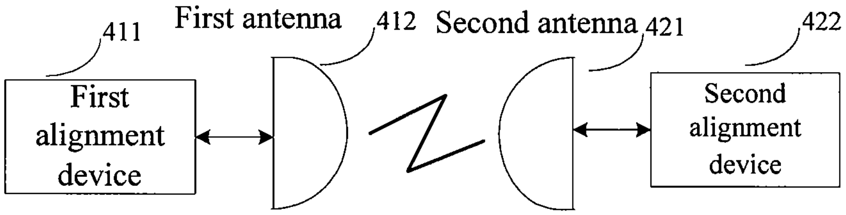
FIG. 4 is a schematic structural view of a system for aligning an antenna according to an embodiment of the present invention.

Referring to FIG. 4, a schematic structural view of a system for aligning an antenna according to an embodiment of the present invention is shown. The system for aligning the antenna includes a first alignment device 411, a second alignment device 422, a first antenna 412, and a second antenna 421.

The first alignment device 411 is adapted to send an alignment output signal to the second antenna 421 through the first antenna 412 according to an extreme value signal.

The second alignment device 422 is adapted to receive the alignment output signal, and adjust and align the second antenna 421 through an antenna adjusting unit in the second alignment device 422 corresponding to the second antenna 421 according to a strength of the alignment output signal.

The manner of processing the received alignment output signal by the second alignment device 422 is the same as the processing method of the alignment device 21 in FIG. 2 of the embodiment of the present invention, so the description is omitted here. When the second antenna corresponding to the second alignment device 422 is adjusted, the position of the first antenna must remain unchanged so as to align the antennas on two ends more quickly. In the embodiment of the present invention, the first alignment device 411, the second alignment device 422, and the alignment device 21 in FIG. 2 are of the same category and based on the same concept. It may be known by those of ordinary skill in the art that the first alignment device 411 and the second alignment device 422 are receiving devices transceiving to each other. Before the antenna is aligned and adjusted, the antenna is vertically adjusted by using a level instrument so as to ensure that the antennas of a sending end and a receiving end are vertical to a horizontal plane. Next, a horizontal rough adjusting is performed so as to ensure that the antennas of the two ends may receive the signal sent from the peer end.

It may be known that in the present invention, through the practically received power value acquiring unit, the alignment judging unit, and the antenna adjusting unit, the antenna alignment device automatically calculates and outputs the alignment indication signal of the antenna, so that the antenna is aligned, requirements of microwave antenna professional knowledge on operators is lowered, the man-made operation errors are reduced, the network quality is effectively ensured, and the manpower cost is lowered.

Through the description of the implementation manner, those skilled in the art may clearly know that the present invention may be realized by using the software and the necessary hardware platform, and definitely may be realized by using the hardware, but under most of the situations, the former one is more preferred. Based on this understanding, the technical solution of the present invention contributing to the prior art may be entirely or partly realized in the software product form. The computer software product is stored in a storage medium, such as a read only memory (ROM)/random access memory (RAM), a floppy disk, or an optical disk, and includes several instructions adapted to enable a computer device (such as a personal computer, a server, or a network device) to execute the method according to each embodiment or certain parts of the embodiments of the present invention.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A device for aligning an antenna, comprising a receiving unit, a practically received power value acquiring unit, an alignment judging unit, an antenna adjusting unit, and an alignment indicating unit, wherein the receiving unit is adapted to receive an input signal, and output a receiver signal strength indication (RSSI) value according to a strength of the input signal;

the practically received power value acquiring unit is adapted to receive the RSSI value, and acquire a practically received power value corresponding to the input signal by looking up a corresponding table between RSSI and power;

the alignment judging unit is adapted to compare the practically received power value with a theoretically received power threshold value, output an antenna rotation signal to the antenna adjusting unit when the practically received power value is smaller than the theoretically received power threshold value, and output an alignment indication signal to the alignment indicating unit when the practically received power value is greater than or equal to the theoretically received power threshold value;

the antenna adjusting unit is adapted to adjust the antenna according to the antenna rotation signal so as to change a receiving angle of the antenna;

the alignment indicating unit is adapted to display that the antenna is aligned according to the alignment indication signal;

the alignment judging unit further comprises an extreme value determining module adapted to use a maximum value of the practically received power value during an adjustment process as an extreme value when the practically receive power value is greater than or equal to the theoretically received power threshold value and output a first extreme value signal to the antenna adjusting unit;

the antenna adjusting unit is further adapted to fix a position of the antenna according to the first extreme value signal;

the extreme value determining module is further adapted to output the first extreme value signal to the receiving unit; and the receiving unit is further adapted to send through the antenna an alignment output signal to a peer end antenna according to the first extreme value signal, the alignment output signal used to adjust an alignment position of the peer end antenna.

2. The device according to claim 1, wherein the extreme value determining module is further adapted to when the practically received power value is greater than or equal to the theoretically received power threshold value, output a second extreme value signal to the antenna adjusting unit; and the antenna adjusting unit is further adapted to fix a position of the antenna according to the second extreme value signal.

3. The device according to claim 1, wherein the receiving angle of the antenna changes within the range between −90 degree and +90 degree with an antenna stand as a rotation axis.

4. The device according to claim 1, wherein the practically received power value acquiring unit further comprises a first storage module adapted to save the corresponding table between RSSI and power; and the alignment judging unit further comprises a second storage module adapted to save the theoretically received power threshold value.

5. The device according to claim 1, wherein the alignment indicating unit is particularly an interface adapted to provide an indication in high electrical level, low electrical level or square wave form, an indicator displayed interface, or a buzzer displayed interface.

6. A method for aligning an antenna, comprising:

receiving an input signal, and outputting a receiver signal strength indication (RSSI) value according to a strength of the input signal;

receiving the RSSI value, and acquiring a practically received power value corresponding to the input signal by looking up a corresponding table between RSSI and power;

comparing the practically received power value with a theoretically received power threshold value, outputting an antenna rotation signal when the practically received power value is smaller than the theoretically received power threshold value, and outputting an alignment indication signal when the practically received power value is greater than or equal to the theoretically received power threshold value;

adjusting the antenna according to the antenna rotation signal so as to change a receiving angle of the antenna; and displaying that the antenna is aligned according to the alignment indication signal, wherein the outputting of the alignment indication signal when the practically received power value is greater than or equal to the theoretically received power threshold value, further comprises using a maximum value of the practically received power value during an adjustment process as an extreme value, outputting a first extreme value signal as the antenna rotational signal for adjusting the antenna to change the receiving angle of the antenna according to the first extreme value signal, and outputting through the antenna an alignment signal to a peer end antenna according to the first extreme value signal, the alignment output signal used to adjust an alignment position of the peer end antenna to the antenna.

7. The method according to claim 6, wherein when the practically received power value is greater than or equal to the theoretically received power threshold value, a second extreme value signal is output; and the adjusting of the antenna to change the receiving angle of the antenna is according to the second extreme value signal.

* * * * *